Aug. 27, 1957  E. F. RIESING  2,804,325
FLUID SEAL
Filed July 16, 1954
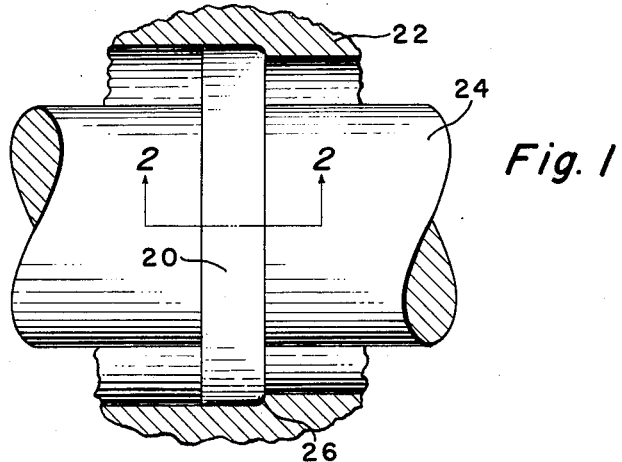
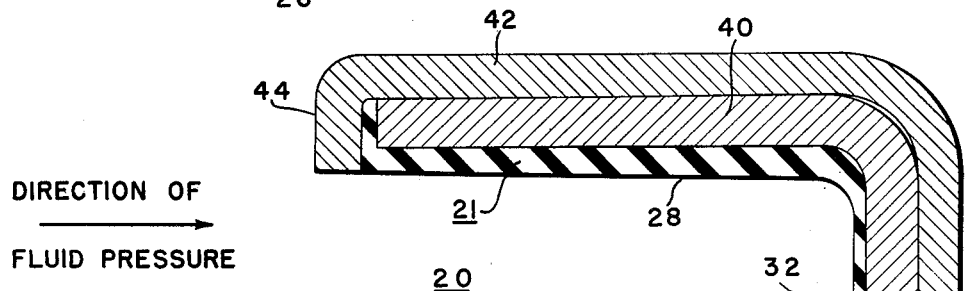
DIRECTION OF
⟶
FLUID PRESSURE
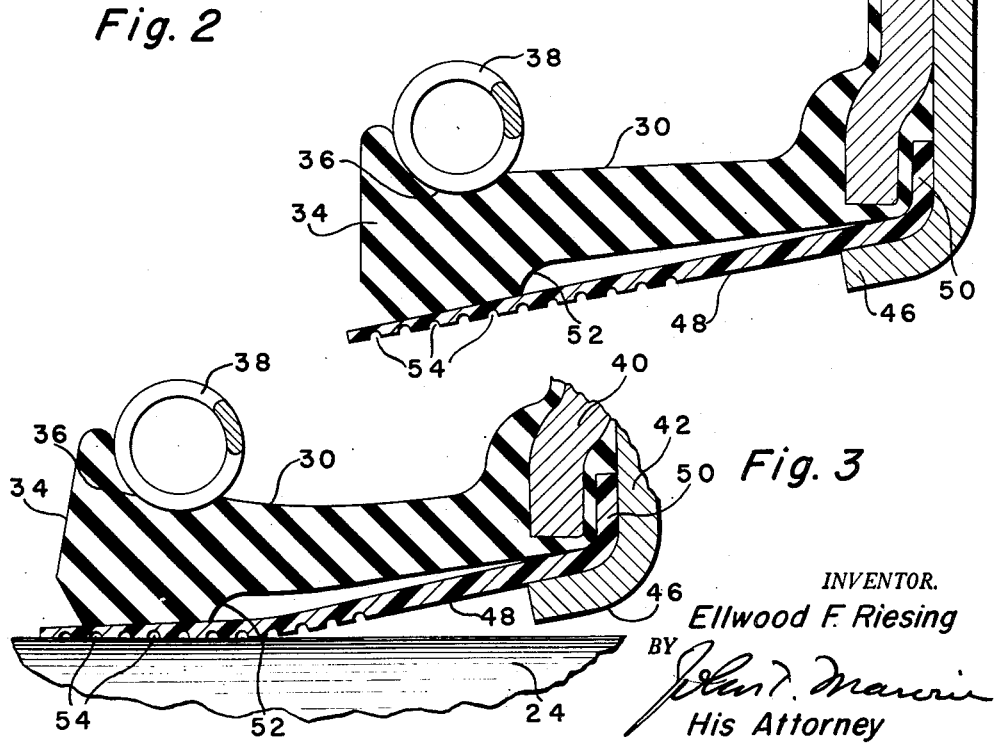
INVENTOR.
Ellwood F. Riesing
BY
His Attorney

United States Patent Office 2,804,325
Patented Aug. 27, 1957

2,804,325

FLUID SEAL

Ellwood F. Riesing, Dayton, Ohio, assignor to General Motors Corporation, Detroit, Mich., a corporation of Delaware Application July 16, 1954, Serial No. 443,853

4 Claims. (Cl. 288—3)

This invention relates to fluid seals and is particularly concerned with fluid seals of the radial type adapted to seal a passage between two concentric, relatively movable cylindrical surfaces.

It is one object of the invention to provide a fluid seal of the radial type for sealing a shaft within its housing, wherein a unitary seal assembly includes a freely flexible sealing lip or sheath that is formed from a material different than the material in the remainder of the seal and wherein yieldable means are preferably provided for increasing the sealing forces by radially acting upon a portion of the seal which in turn bears upon the sealing lip.

In carrying out the above object, it is a further object of the invention to provide the sealing surface of said sealing lip with a plurality of spaced apart concentric grooves for improving the sealing characteristics of the device.

Still another object of the invention is to provide a seal including a flexible sealing lip which extends a substantial distance along the shaft to be sealed, wherein the point of attachment of said lip with the remainder of the seal is at one end thereof while the sealing surface is adjacent the other end thereof whereby eccentricity of rotation between the parts being sealed does not effect the sealing qualities of the device.

Another object of the invention is to provide a shaft seal of the radial type for sealing a rotatable shaft within a stationary housing member, which seal fits snugly within the housing in non-rotative relation thereto and which includes a sealing lip surrounding the shaft and uniformly inwardly compressed by means of a garter spring, a second sealing lip being interposed between said first mentioned lip and said shaft and comprising a sheath hermetically associated with the remainder of the seal at a point remote from said first mentioned sealing lip, said second mentioned lip being a snug fit around said shaft at its sealing end, said end being further circumferentially compressed against said shaft by the conjoint action of the garter spring and the first mentioned sealing lip.

A still further object of the invention is to provide a fluid seal of the radial type which includes a secondary wear resistant, flexible sealing sheath which has different frictional properties than the remainder of the seal and which is interposed between the main portion of the seal and the moving part to be sealed whereby the efficiency and life of the entire sealing structure is improved.

Further objects and advantages of the present invention will be apparent from the following description, reference being had to the accompanying drawing, wherein a preferred embodiment of the present invention is clearly shown.

In the drawing:

Fig. 1 is a fragmentary view in section showing a portion of a shaft and housing with a fluid seal in place.

Fig. 2 is a greatly enlarged view of a section of the fluid seal taken on line 2—2 of Fig. 1 in the unconfined condition.

Fig. 3 is a fragmentary view of a portion of the seal shown in Fig. 2 in the installed position with the sealing portions thereof flexed into sealing engagement with a portion of the shaft.

Referring specifically to Fig. 1 of the drawing, a fluid seal 20 is shown in installed position between a housing 22 and a shaft 24 which may be rotatable therein. The housing 22 preferably includes an annular shoulder 26 therearound against which the fluid seal 20 is seated.

The fluid seal 20 comprises a body 21 of elastomeric material including two radially spaced flanges wherein one of said flanges 28 is a positioning flange and the other of said flanges 30 may be termed a sealing flange. Flanges 28 and 30 are integrally connected by a web 32 to form an open channel therebetween. At the outer extremity of flange 30 is a lip portion 34 preferably including an annular groove 36 therearound in which a garter spring 38 may be positioned if desired. The garter spring 38 is used to draw the lip portion 34 radially inwardly so that it snugly embraces the shaft 24. It is apparent that in some applications, the yieldable nature of the elastomer may provide sufficient sealing pressure for this purpose. The body 21 may be bonded in part to a flanged annular metal member 40 provided for reinforcing purposes, if desired, which metal member may be encased in a second annular metal member or cage 42 that has a turned over flange 44 of annular shape at one end thereof and a second turned over flange 46 of annular shape at its opposite end which is used to maintain an assembly of parts to be described hereinafter.

Interposed between the sealing lip 34 and the shaft 24 is a second sealing member 48. The member 48 may be termed a flanged sheath and includes an outwardly turned flange 50 therearound which may be gripped and hermetically clamped between the metal members 40 and 42 and web 32 as shown in Fig. 2. The sheath 48 extends outwardly from its flanged portion 50 into contiguous relation with the outer surface of the sealing lip 34. The cross section of this sheath is preferably of tapered shape as noted in Fig. 2. It will also be noted that the sealing flange 30 is preferably recessed at 52 so as to give relief to the back side of the sheath 48 and thus increase its flexibility. At the sealing surface of the sheath 48 and adjacent the extremity thereof, a plurality of annular grooves 54 may be formed. These grooves are preferably included in the sheath since they improve the sealing effect thereof. The grooves may be concentrically arranged in spaced relation axially of the sheath or may be a reverse spiral which tends to pump the sealed fluid away from the sealed surface or a combination of these expedients may be used.

In operation, the seal assembly 20 is passed over the shaft 24 so that the grooved portion of the sheath 48 contacts the shaft 24. This causes the sealing flange 30 and lip portion 34 to flex inwardly against the tension of the spring 38. When the device is installed in the housing 22 and preferably against the shoulder 26, it is non-rotatable with respect to the housing and the shaft then turns against the sheath 48 which is held in sealing relation thereto by the conjoint action of the sealing flange 30 and the garter spring 38.

The value of this type of construction may be set forth as follows: The elastomeric material, normally used in fluid seal assemblies, is preferably polychloroprene, butadiene-acrylonitrile copolymer, polyacrylates, etc. These synthetic types of "rubbers" are quite oil-resistant and in general provides satisfactory seals. However, under continued use at elevated temperatures, there is a tendency for the sealing lip portion of the seal to become hardened and take a permanent set which is not fully overcome by the action of the garter spring. Furthermore, if the shaft 24 is at all eccentric in its rotation with respect to the housing, there is a tendency for the sealing lip 34 to leave the shaft during moments of eccentricity due to the age-hardening thereof, which causes a periodic leakage upon each revolution of the shaft.

The addition of sealing sheath 48 eliminates entirely these difficulties. The sealing sheath 48 is preferably made of a different material than the remainder of the seal, one that has good bearing properties, is flexible, resistant toward age-hardening at elevated temperatures and has long-wearing characteristics. This sheath is preferably formed so that it is in itself a snug sealing fit around the shaft, which sealing fit is enhanced by the conjoint action of the sealing lip and the garter spring of the remainder of the seal which tend to draw the sheath radially inwardly snugly around the shaft.

Upon eccentric movements of the shaft, the sheath follows the shaft due to the fit and physical structure thereof and even if the sealing lip of the seal tends to leave the shaft, no leakage occurs. In this manner, a highly efficient seal is provided.

The material from which the sheath is made is of some import and, although, various rubbers of the synthetic type as hereinbefore noted may be used, I prefer to use one of the newer heat-resisting materials, such as, polytetrafluoroethylene which is sold under the trade name "Teflon" or other flexible heat and wear-resistant fluo-organic compounds, examples of these are modified polyfluoroethylenes, one of which is sold under the trade name "Kel-F." This material is tough, has extremely good wearing properties, is sufficiently flexible to meet the limited requirements noted herein and is very heat-resistant. Furthermore, "Teflon" can be worked in much the same manner as metal in that it can be drawn from a flat sheet to a point of molecular orientation which causes alignment of molecules that tend to maintain the shape of the drawn part. The orientation is carried out under conditions closely approaching the yield point of the material which leaves some resiliency in the drawn part which aids in the sealing operation. Furthermore, by using these limitations in the deep drawing of the sheath, the material has the constant tendency to return to its original state, namely, a flat sheet. This creates the condition wherein the sheath tends to maintain its sealing action at all times and even with wear, it will remain snugly fitted about the shaft.

In order to obtain a micro-smooth surface on the "Teflon," I prefer that the "Teflon" sheath be made directly from tetrafluoroethylene latex which yields a very smooth surface, generally not obtainable by making the sheath from molding powders. However, this is of no importance providing the sealing surface of the "Teflon" sheath is sufficiently smooth to provide the desired sealing effect.

The sealing sheath as formed from "Teflon," which is highly heat-resistant acts as a protection for the elastomer and it has been found that the elastomer will resist age-hardening due to conditions of elevated temperatures three to four times longer than in conventional applications. This is because of the insulating qualities of the "Teflon" and because of the reduction in heat caused by friction, since the "Teflon" runs cooler than the elastomer.

It is apparent from the foregoing that I have provided a seal having entirely different characteristics than the usual fluid seal in that a flexible sheath is used which embraces the shaft for sealing the same, which sealing effect is enhanced by the conjoint action of the usual sealing lip on the seal in cooperation with spring means, preferably of the garter spring type. Such a seal not only prevents fluid flow between the shaft and housing wherein reciprocal movement may be present, but likewise, seals upon relative rotation of one member to the other while maintaining its full efficiency toward sealing even when eccentricity of rotation becomes apparent.

The addition of the sealing sheath may be made to most types of fluid seals for improving their sealing action when operating conditions, due to heavy duty work, elevated operating temperatures, eccentricity of movement, etc., require improvement of the sealing qualities. Typical examples of more conventional types of fluid seals are shown in my copending applications, Serial Nos. 324,324, still pending, 324,328, now U. S. Patent 2,736,585 issued February 28, 1956, 324,325, now U. S. Patent 2,736,586 issued February 28, 1956, 324,326, now U. S. Patent 2,768,849 issued October 30, 1956 and 324,327, now U. S. Patent 2,736,584 issued February 28, 1956.

While the embodiment of the present invention as herein disclosed, constitutes a preferred form, it is to be understood that other forms might be adopted.

What is claimed is as follows:

1. A fluid seal of the radial type for sealing a shaft to a housing, said seal comprising, an annular body portion of elastomeric material, a transverse web portion integral with the body portion and extending therefrom and an elongate annular flexible sealing flange extending axially of the shaft and in generally opposed relation to said body portion from said web, an annular sealing lip at the outer extremity of said flange and having a radial thickness greater than the thickness of the flange and extending radially inwardly therefrom so as to closely embrace said shaft, a garter spring acting on said lip for radially compressing the lip around said shaft and an independent flanged and elongated annular sheath made from polytetrafluoroethylene also surrounding the shaft and interposed between said sealing lip and shaft and sealingly associated with the web portion only at a point remote from said sealing lip, said sheath contacting the inner surface of said sealing lip and being held in sealing relation with the shaft by the conjoint action of the sealing lip and said garter spring, said sheath being spaced from other portions of said elongate sealing flange so as to be free to move independent of said flange.

2. A seal as claimed is claim 1 wherein the sealing end of the sheath includes a plurality of annular grooves at the shaft sealing portion thereof.

3. The seal as claimed in claim 1 wherein the sealing flange is recessed away from the sheath at all points intermediate the sealing lip and the point of association of the sheath and web.

4. The seal as claimed in claim 1 wherein the body portion of elastomeric material, the web and a portion of the sheath are encased in a metal cage for holding said parts in desired relation with respect to one another.

References Cited in the file of this patent

UNITED STATES PATENTS

| 2,227,771 | Victor et al. | Jan. 7, 1941 |
| 2,596,174 | Reich | May 13, 1952 |
| 2,597,976 | Cousins | May 27, 1952 |
| 2,599,149 | Allen | June 3, 1952 |
| 2,750,212 | Skinner | June 12, 1956 |

FOREIGN PATENTS

| 876,866 | France | Aug. 24, 1942 |
| 657,964 | Great Britain | Oct. 3, 1951 |